US012380212B2

United States Patent
Yan et al.

(10) Patent No.: US 12,380,212 B2
(45) Date of Patent: Aug. 5, 2025

(54) RETURN ADDRESS VALIDATION WATCHDOG TO DISCOVER ROP CHAINS IN EXPLOITS ENGINEERING CLOUD DELIVERED SECURITY SERVICES (CDSS)

(71) Applicant: Palo Alto Networks, Inc., Santa Clara, CA (US)

(72) Inventors: Tao Yan, San Jose, CA (US); Edouard Bochin, Santa Clara, CA (US); Bo Qu, Saratoga, CA (US); Zhibin Zhang, Santa Clara, CA (US); Michael Harbison, Salisbury, MD (US)

(73) Assignee: Palo Alto Networks, Inc., Santa Clara, CA (US)

( * ) Notice: Subject to any disclaimer, the term of this patent is extended or adjusted under 35 U.S.C. 154(b) by 189 days.

(21) Appl. No.: 18/122,268

(22) Filed: Mar. 16, 2023

(65) Prior Publication Data

US 2024/0311479 A1    Sep. 19, 2024

(51) Int. Cl.
*G06F 21/50* (2013.01)
*G06F 21/53* (2013.01)
*G06F 21/56* (2013.01)

(52) U.S. Cl.
CPC ............ *G06F 21/566* (2013.01); *G06F 21/53* (2013.01)

(58) Field of Classification Search
CPC ........ G06F 21/566; G06F 21/53; G06F 21/50; G06F 21/51; G06F 21/55; H04L 63/14; H04L 63/1433; H04L 63/1441; H04L 63/1466
See application file for complete search history.

(56) References Cited

U.S. PATENT DOCUMENTS

| | | | |
|---|---|---|---|
| 7,607,122 B2 | 10/2009 | Hatlelid | |
| 8,042,179 B2 | 10/2011 | Shoji | |
| 9,424,427 B1 * | 8/2016 | Chiriac | G06F 21/566 |
| 9,594,912 B1 | 3/2017 | Thioux | |
| 9,904,485 B2 | 2/2018 | Gopal | |
| 10,284,591 B2 | 5/2019 | Giuliani | |
| 2005/0044292 A1 | 2/2005 | McKeen | |
| 2007/0166051 A1 * | 7/2007 | Sebayashi | H04L 63/1441 398/177 |
| 2010/0192026 A1 | 7/2010 | Abadi | |
| 2012/0047579 A1 | 2/2012 | Ishiyama | |
| 2012/0167120 A1 | 6/2012 | Hentunen | |
| 2015/0213260 A1 | 7/2015 | Park | |
| 2016/0357958 A1 * | 12/2016 | Guidry | G06F 21/53 |
| 2017/0083701 A1 * | 3/2017 | Tajalli | G06F 21/79 |
| 2019/0318090 A1 * | 10/2019 | Sandoval | G06F 21/566 |

* cited by examiner

*Primary Examiner* — Malcolm Cribbs
(74) *Attorney, Agent, or Firm* — Van Pelt, Yi & James LLP

(57) ABSTRACT

The present application discloses a method, system, and computer system for detecting Return Oriented Programming (ROP) exploits. The method includes (i) intercepting, by one or more processors, a memory attribute change function for a sample; (ii) determining if a return address is associated with a shellcode address, and (iii) in response to determining that the return address is associated with the shellcode address, determining that the sample is an ROP exploit.

23 Claims, 9 Drawing Sheets

510

An exploit vulnerability in the chrome javascript engine V8 (CVE-2019-5782)

Code snippet of creating the ROP chain to call VirtualProtect()

```
Let stack = [
pop_rcx_ret,
sc_addr,        //lpAddress: shellcode address
pop_rdx_ret,
new Int64(0x1000).asDouble(),   //Size: 0x1000
pop_r8_ret,
new Int64(0x40).asDouble(), //flNewProtect:RWE
pop_r9_ret,
scratch_addr,  //lpflOldProtect: Out
virtualprotect_adddr,   //VirtualProtect address
sc_addr,  //return address: shellcode address
];
```

520

Watchdog: VitualProtect() triggered

Parameter Check: 0x40
PAGE_EXECUTE_READWRITE(RWE)

Return Address check: 0x1B61A5A23400

[1] start (0x1B16A5A23400) <= 0x1B61A5A23400 < end (0x1B61A5A24400)
[2] memory page type: NOT MEM_IMAGE
[3] NOT belong to any loaded module Verdict: ROP

RETURN ADDRESS VALIDATION WATCHDOG TO DISCOVER ROP CHAINS IN EXPLOITS ENGINEERING CLOUD DELIVERED SECURITY SERVICES (CDSS)

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm. Techniques for detecting malware may be performed locally by a firewall or via a cloud service.

BRIEF DESCRIPTION OF THE DRAWINGS

Various embodiments of the invention are disclosed in the following detailed description and the accompanying drawings.

FIG. 5 is a diagram of an example of an ROP exploit and detection of the ROP exploit during runtime.

DETAILED DESCRIPTION

Figure 1:
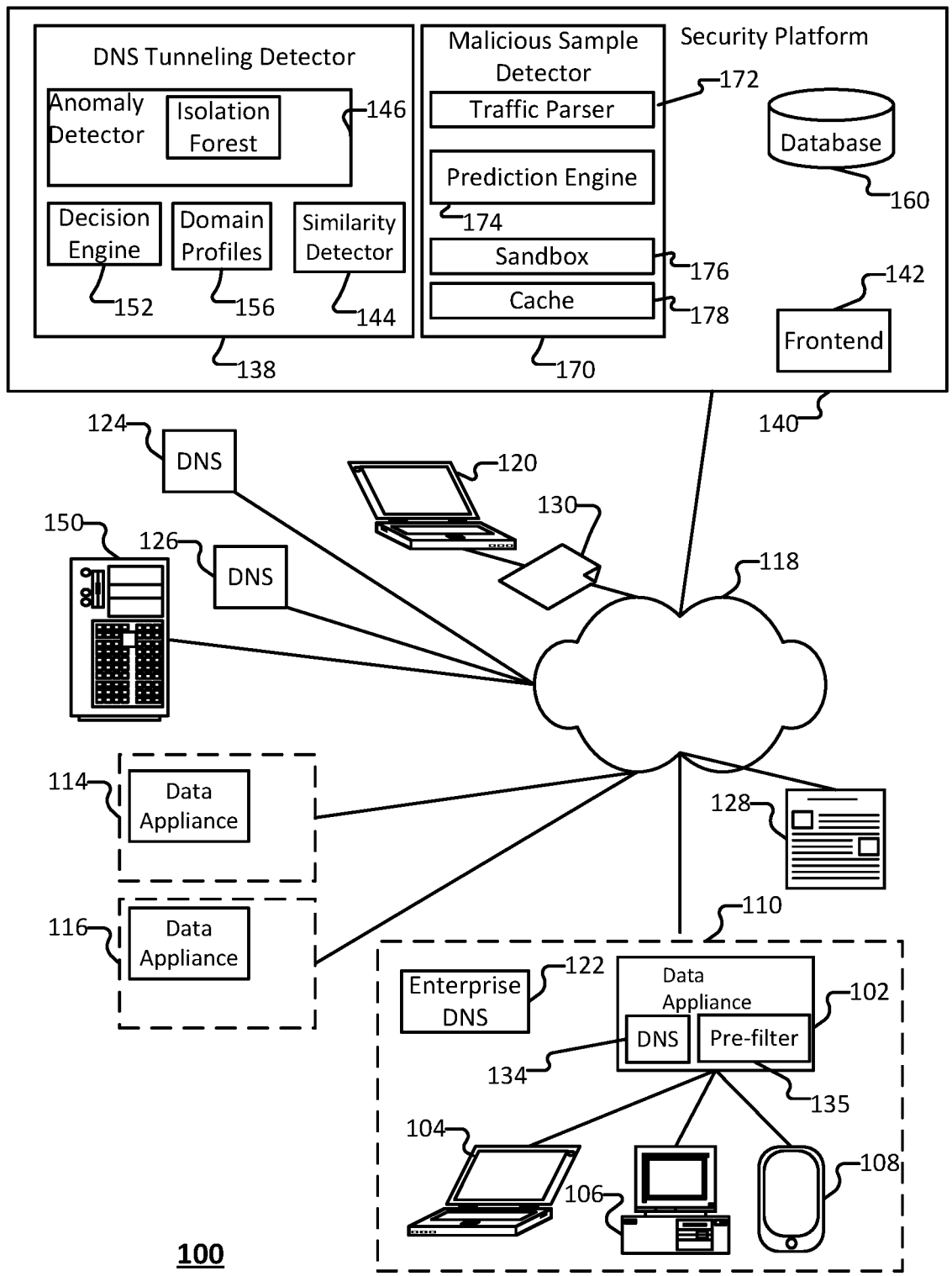
FIG. 1 is a block diagram of an environment in which maliciousness of traffic is evaluated according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a Return Oriented Programming (ROP) exploit may mean a security exploit in which an attacker gains control of a call stack to hijack the program control flow, and then execute carefully chosen machine instructions.

As used herein, a shellcode may mean a small piece of code used as a payload in an exploitation of software vulnerabilities.

As used herein, a sample may include a document (e.g., a .doc), a pdf, a file, a URL, HTMLs, or other files or network traffic.

As used herein, an inline security entity may include a network node (e.g., a device) that enforces one or more security policies with respect to information such as network traffic, files, etc. As an example, a security entity may be a firewall. As another example, an inline security entity may be implemented as a router, a switch, a DNS resolver, a computer, a tablet, a laptop, a smartphone, etc. Various other devices may be implemented as a security entity. As another example, an inline security entity may be implemented as an application running on a device, such as an anti-malware application. As another example, an inline security entity may be implemented as an application running on a container or virtual machine.

ROP exploits are generally effective in the presence of other security defense mechanisms because ROP exploits are difficult to be discovered. For example, ROP exploits can easily bypass security detections because of their corresponding complexity and flexibility. Related art security defenses implementing static evaluation methods are generally application specific and easy to be bypassed through use of obfuscation. Related art security defenses implementing dynamic evaluation methods use malicious behavior monitoring methods that may be easily bypassed. For example, dynamic evaluation methods analyze behaviors of the trojan (e.g., monitors whether the trojan creates processes, accesses sensitive files, creates registries, etc.).

In an ROP exploit, the attacker exploits the vulnerability in the application and hijacks the execution flow to the ROP chain. In response to hijacking the execution flow, the ROP exploit calls a memory attribute change function in the ROP chain to configure the memory comprising the shellcode to be executable. The memory attribute change function may be configured to have a return address corresponding to the shellcode. Once the memory comprising the shellcode is configured to be executable, the return address of the memory change function comprises the shellcode and the shellcode is caused to be executed during runtime. As an example, the ROP exploit is embedded in a HTML or an email (e.g., a pdf file is faked and used as an attachment to an email, etc.).

Related art security systems implement Data Execution Prevention (DEP) protection on Windows or its equivalent on Linux, the no execute (NX) protection, to restrain the memory attributes of certain regions in a running process memory. With those protections, an attacker cannot execute malicious shellcode on the stack or on the heap as the memory regions of the latter are set to have a read-write (R-W) attribute without being executable (E). ROP exploits use a technique that allows an attacker to execute code in the presence of security defenses such as executable space protection and code signing. In such techniques, an attacker gains control of the call stack to hijack program control flow and then executes carefully chosen machine instruction sequences that are already present in the machine's memory, called "gadgets". Each gadget typically ends in a return instruction and is located in a subroutine within the existing program and/or shared library code. Chained together, these gadgets allow an attacker to perform arbitrary operations on a machine employing defenses that thwart simpler attacks.

Various embodiments include a system, device, and/or method for detecting Return Oriented Programming (ROP) exploits. The method includes (i) intercepting, by one or more processors, a memory attribute change function for a sample; (ii) determining if a return address is associated with a shellcode address, and (iii) in response to determining that the return address is associated with the shellcode address, determining that the sample is an ROP exploit.

Various embodiments include a system, device, and/or method for detecting Return Oriented Programming (ROP) exploits. The method includes (i) intercepting, by one or more processors, a memory attribute change function for a sample; (ii) determining a return address; (iii) determining if the return address is associated with a shellcode address, and (iv) in response to determining that the return address is associated with the shellcode address, determining that the sample is an ROP exploit.

In response to receiving a sample or in response to receiving an indication that a sample is to be executed, the system performs an evaluation of the sample. For example, the system evaluates the maliciousness (e.g., determines whether the sample is malicious or benign).

In some embodiments, the system may perform a quick/low latency check for the maliciousness of the sample based at least in part on determining (e.g., computing) a signature for the sample (e.g., according to a predefined signature function), and querying a mapping of sample signatures to indications of maliciousness of samples. For example, the system computes the sample signature and queries a whitelist to determine whether the sample is included in the whitelist (e.g., a list of samples deemed to be benign). As another example, the system computes the sample signature and queries a blacklist to determine whether the sample is included in the blacklist (e.g., a list of samples deemed to be malicious).

The system may perform a more robust/higher latency check for the maliciousness of the sample. For example, the system determines to perform the more robust/higher latency check in response to determining that a sample signature is not included in the mapping of sample signatures to indications of maliciousness of samples (e.g., a whitelist or a blacklist, etc.). For example, the system determines to perform the more robust/higher latency in response to determining that the system had not previously evaluated the maliciousness of the sample.

An application process memory generally includes two sections: a code section and a data section. In the code section, the memory attribute for the corresponding memory address(es) is set to read and execute. Conversely, in the data section (e.g., the stack or heap), the memory attribute for the corresponding memory address(es) is set to read/write and is not executable.

In connection with performing the more robust/higher latency check for the maliciousness of the sample, the system performs a dynamic analysis to evaluate whether the sample is an ROP exploit. In some embodiments, the system determines whether the sample is malicious based at least in part on a memory attribute change function being performed with respect to the data section of an application process and/or a return address of the memory attribute change function corresponding to an area in the application process memory that comprises the shellcode. In benign samples, the return address of the memory attribute change function is generally always within the code section of the application process memory, which behaves different than an area of the application process memory with a shellcode address.

Various embodiments evaluate the maliciousness of samples based at least in part on monitoring the memory attribute change function calls and, by performing multiple checks on the return address of the memory attribute change function to detect the ROP chain before the malicious shellcode is executed.

In some embodiments, the system monitors the functions called during runtime of the sample and for a change in a configuration of a memory to be executable. The system may determine that the sample is an exploit in response to (i) determining that a configuration of a memory address is changed to be executable during runtime, and/or (ii) determining that a return address for the memory attribute change function corresponds to a memory address in which the shellcode is stored (e.g., the return address for the memory change function corresponding to an area comprising the shellcode may be indicative that the shellcode is executed right after the memory attribute change function returns). In some embodiments, a sample is deemed to be an ROP exploit in response to determining that at least one of (i) and (ii) above is satisfied. In some embodiments, a sample is deemed to be an ROP exploit in response determining that both (i) and (ii) above are satisfied.

In some embodiments, the system determines that a memory attribute change function is called based at least in one or more hooks. For example, the system injects one or more hooks with respect to execution of the sample. The hooks may be configured to be triggered in response to the memory attribute change function being called/executed or a change in a memory attribute parameter from non-executable to executable. For example, the hook(s) is configured to monitor whether at least part of the data section of the application process memory is set to executable (e.g., read/ write/executable). An ROP exploit implements the exploitation technique by setting up the return address of the memory attribute change function to be the address of the malicious shellcode in the ROP chain, so when the function returns, it would jump directly to the execution of the shellcode.

In some embodiments, the system determines that the return address of the memory attribute change function corresponds to the shellcode address based at least in part on determining that the return address corresponds to a location in the memory that is outside the code section (e.g., the return address corresponds to a location in the data section of the application process memory).

According to various embodiments, detection of malicious samples may be implemented at an endpoint (e.g., a client system), an inline security (e.g., a firewall), a cloud security service, etc.

FIG. 1 is a block diagram of an environment in which maliciousness of traffic is evaluated according to various embodiments. In some embodiments, system 100 implements at least part of system 400 of FIG. 4, process 600 of FIG. 6, process 700 of FIG. 7, process 800 of FIG. 8, and/or process 900 of FIG. 9.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is an inline security entity. Data appliance performs low-latency processing/analysis of incoming data (e.g., traffic data) and determines whether to offload any processing of the incoming data to a cloud system, such as security platform 140.

In some embodiments, system 100 implements an evaluation of a maliciousness of samples. The evaluation of the maliciousness of samples may be implemented locally at client devices 104-108 or at data appliance 102 as network traffic is sent across data appliance 102. In some embodiments, the maliciousness of the samples is evaluated remotely at a cloud service, such as security platform 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 may be a cloud system such as a cloud service security entity. Security platform 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160.

In various embodiments, security platform 140 comprises one or more dedicated commercially available hardware servers (e.g., having multi-core processor(s), 32 G+ of RAM, gigabit network interface adaptor(s), and hard drive (s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, system 100 uses security platform 140 to perform processing with respect to traffic data offloaded by data appliance 102. Security platform 140 provides one or more services to data appliance 102, client device 120, etc. Examples of services provided by security platform 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), an Internet of Things (IoT) service. Various other service may be implemented.

In some embodiments, system 100 (e.g., malicious sample detector 170, security platform 140, etc.) trains a detection model to detect exploits (e.g., malicious samples), malicious traffic, or application identifiers. Security platform 140 may store blacklists, whitelists, etc. with respect to data (e.g., mappings of signatures to malicious files, etc.). In response to processing traffic data, security platform 140 may send an update to inline security entities, such as data appliance 102. For example, security platform 140 provides an update to a mapping of signatures to malicious files, an update to a mapping of signatures to benign files, etc.

According to various embodiments, the model(s) trained by system 100 (e.g., security platform 140) is obtained using a machine learning process. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) is a combined feature vector or set of features vectors and based on the combined feature vector or set of feature vectors the classifier model determines whether the corresponding traffic (e.g., input string) is malicious, or a likelihood that the traffic is malicious (e.g., whether the traffic is exploit traffic).

In some embodiments, system 100 detects ROP exploits based at least in part on evaluating a set of calls invoked during runtime of a sample, a change in a memory attribute such as for at least part of a data section of the application process memory, and/or a return address for a memory attribute change function (e.g., to determine whether the process called upon returning from the memory attribute change function corresponds to a process stored in the data section of the application process memory, etc.).

According to various embodiments, security platform 140 comprises DNS tunneling detector 138 and/or malicious sample detector 170. Malicious sample detector 170 is used in connection with determining whether a sample (e.g., traffic data) is malicious. For example, malicious sample detector 170 determines whether the sample is an ROP exploit. In response to receiving a sample (e.g., a pdf, an html, etc.), malicious sample detector 170 analyzes the sample, and determines whether the sample is malicious. For example, malicious sample detector 170 determines whether a memory attribute change function is invoked in connection with changing a memory attribute for at least part of a memory in a data section of the application process memory. As another example, malicious sample detector 170 determines whether a return address for the memory attribute change function corresponds to a location within the data section of the application process memory. Malicious sample detector 170 determines (e.g., predicts) whether the sample is malicious (e.g., whether the sample corresponds to an ROP exploit) based at least in part on one or more of (i) the invocation of the memory attribute change function to change a memory attribute for a location in the data section to be executable, and (ii) the return address for the memory attribute change function being within the data section (e.g., a shellcode stored in the data section).

In various embodiments, malicious sample detector 170 evaluates samples and predicts whether the samples are malicious according to one or other techniques. For example, in some embodiments, malicious sample detector 170 uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, sandbox 176, and/or cache 178.

Traffic parser 172 is used in connection with obtaining a sample being analyzed. The sample may be obtained by network traffic or from a prediction request communicated to security platform 140, such as by a security entity (e.g., a firewall) or a client system. Traffic parser 172 may further parse/extract information from the sample (e.g., the file), such as from a header of the file or other attributes that may be used in connection with evaluating whether the sample is malicious.

In some embodiments, in response to receiving a sample for which malicious sample detector 170 is to evaluate for maliciousness (or a likelihood that the sample is malicious), malicious sample detector 170 monitors the samples, such as in an isolated environment (e.g., sandbox 176). Malicious sample detector 170 may instantiate a new isolated environment (e.g., on a virtual machine) for each sample to be evaluated. Alternatively, malicious sample detector 170 may use the same isolated environment for evaluating a plurality of samples. In response to determining (e.g., instantiating, allocating, etc.) the isolated environment for evaluating a particular sample, malicious sample detector 170 evaluates the sample while the sample is running in the isolated environment (e.g., sandbox 176). Malicious sample detector 170 predicts whether the sample is malicious (or specifically whether the sample is an ROP exploit).

Malicious sample detector 170 uses prediction engine 174 to predict whether the sample is malicious based on the monitoring of the sample (e.g., during runtime) within sandbox 176. In response to determining the isolated environment (e.g., sandbox 176) in which the sample is to be monitored, malicious sample detector 170 configures the isolated environment and/or the sample. For example, malicious sample detector 170 configures (e.g., injects) one or more hooks (e.g., into the application process). Malicious sample detector 170 uses one or more hooks to monitor for a particular event/change during runtime of the sample. In some embodiments, the one or more hooks are used to monitor for the invocation (e.g., call) of a memory attribute change function during runtime of the sample. For example, the one or more hooks are triggered in response to detecting that the memory attribute change function (e.g., VirtualProtect( ) in Win32 or Win64, etc.) is called during execution of the sample.

In some embodiments, in response to the one or more hooks being triggered (e.g., in response to the memory attribute change function being invoked), malicious sample detector 170 (e.g., prediction engine 174) performs one or more checks in connection with determining whether the sample is malicious (e.g., whether the sample is an ROP exploit). In some embodiments, in response to detecting that the memory attribute change function is invoked, malicious sample detector 170 determines whether the invocation of the memory attribute change function is directed to changing a memory attribute in the data section. For example, malicious sample detector 170 determines whether the memory attribute change function is used to change a location of memory in the data section of the application process memory to be executable (e.g., to be configured as RWE). Because data sections are generally configured to be read/write only and not to be executable, the configuration of at least part of the data section to be executable may be indicative of the sample being malicious (e.g., the sample being configured to execute something within the data section). In some embodiments, malicious sample detector 170 (e.g., prediction engine 174) obtains (e.g., determines) a return address for the memory attribute change function and determines whether the return address for the memory attribute change function corresponds to the address for a shellcode (e.g., the shellcode address). For example, malicious sample detector 170 determines whether the return address for the memory attribute change function is within the data section of the application process memory. Because the return address for memory attribute change functions are typically within a code section of the application memory process, the return address being within the data section may be indicative of the sample being malicious (e.g., the sample being an ROP exploit). Malicious sample detector 170 may obtain the return address and determine whether the return address corresponds to a shellcode address in response to the hook(s) being triggered by invocation of the memory attribute change function or in response to malicious sample detector 170 determining that the memory attribute for the data section (or a part thereof, such as a part comprising the shellcode) is changed to be executable.

In some embodiments, prediction engine 174 determines whether the sample is malicious based at least in part on one or more of (i) a memory attribute for at least part of the data section of the application process memory being configured to be executable, (ii) the return address for the memory attribute change function corresponding to a shellcode address (e.g., the return address corresponding to a location within the data section of the application process memory), and (iii) a mapping of an identifier for a sample (e.g., a hash or other signature associated with the sample) to indications of whether the corresponding sample are malicious. In some embodiments, determining whether the sample is malicious based on identifiers mapped to indications that the sample is malicious may be performed at data appliance 102, or a client device 104-108. For a sample for which an associated identifier (e.g., a hash according to a predefined hashing function or other signature for the sample) is not stored in the mapping(s) of identifiers to malicious samples, data appliance 102 offloads processing of the sample to security platform 140.

Prediction engine 174 is used to predict whether a sample is malicious. According to various embodiments, prediction engine 174 determines whether a newly received sample is malicious based at least in part on a monitoring of the sample during runtime. For example, prediction engine 174 monitors a change in memory attributes or other configurations pertaining to a memory attribute change function. Prediction engine 174 determines that the sample is malicious (e.g., is an ROP exploit) in response to determining one or more of (i) a memory attribute for at least part of the data section of the application process memory being configured to be executable, and (ii) the return address for the memory attribute change function corresponding to a shellcode address (e.g., the return address corresponding to a location within the data section of the application process memory).

In some embodiments, prediction engine 174 determines that the sample is an ROP exploit (e.g., that the sample is malicious) in response to determining that the return address of the memory attribute change function corresponds to a location within the data section of the application process memory. For example, prediction engine 174 determines that the sample is an ROP exploit based on a determination that the return address of the memory attribute change function corresponds to a location in the application process memory at which the shellcode is stored.

Prediction engine 174 may communicate an indication of a verdict of the evaluation of whether the sample is malicious. According to various embodiments, in response to prediction engine 174 determining that the received sample is malicious, security platform 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a blacklist of samples (e.g., corresponding to malicious samples) such as in the case that the received sample is deemed to be malicious, or an update to a whitelist of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for samples comprised in received network traffic and perform a lookup against a mapping of hashes/signatures to indications of whether samples are malicious/benign (e.g., query a whitelist and/or a blacklist). In some embodiments, the hash or signature uniquely identifies the sample.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a blacklist, a whitelist, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical information (e.g., historical files), malicious sample detector 170 may deem that the sample has not yet been analyzed and malicious sample detector 170 can invoke an analysis (e.g., a dynamic analysis) of the sample in connection with determining (e.g., predicting) whether the sample is malicious (e.g., malicious sample detector 170 can allocate an isolated environment, execute the sample within the isolated environment, and monitor the execution of the sample). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on a whitelist or blacklist, etc.). Malicious sample detector 170 (e.g., traffic parser 172) may detect that a sample is newly analyzed in response to security platform 140 receiving the sample from a security entity (e.g., a firewall) or endpoint within a network (e.g., client device 104-108). For example, malicious sample detector 170 determines that a sample is newly analyzed contemporaneously with receipt of the sample by security platform 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample that is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to monitor runtime of the sample such as in an isolated environment) in connection with determining whether the sample is malicious, and malicious sample detector 170 monitors the execution of the sample for a triggering of one or more hooks injected into the application process.

Cache 178 stores information pertaining to a sample (e.g., a pdf, an html, etc.). In some embodiments, cache 178 stores mappings of identifiers for samples to indications of whether sample string is malicious (or likely malicious), such as mappings of hashes or signatures corresponding to samples to indications of whether a sample is malicious (or likely malicious). Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

In some embodiments, one or more of security platform 140, a security entity, and/or a client device is configured to enforce one or more security policies. The security policies may include a policy for handling malicious files/traffic, benign files/traffic, etc.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache (e.g., an inline security evaluation of whether a sample is malicious) or otherwise that certain detected network traffic is to be further analyzed (e.g., using a finer detection model) such as by offloading processing to security platform 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140) and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138 such as decision engine 152 of DNS tunnelling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to resolve an SQL statement or SQL command, or other command injection string, data appliance 102 uses the corresponding sample (e.g., an input string) as a query to a local cache and/or security platform 140. This query can be performed concurrently with resolution of the SQL statement, SQL command, or other command injection string. As one example, data appliance 102 sends a query (e.g., in the JSON format) to a frontend 142 of security platform 140 via a REST API. As another example, data appliance 102 sends the query to security platform 140 (e.g., a frontend 142 of security platform 140) directly from a data plane of data appliance 102. For example, a process running on data appliance 102 (e.g., a daemon, such as the WIFClient, running on the data plane to facilitate offloading of processing data) communicates the query (e.g., request message) to security platform 140 without the query being first communicated to the message plane of data appliance 102, which in turn would communicate the query to security platform 140. For example, data appliance 102 is configured to use a process running on a data plane to query security platform 140 without mediation via a management plane of data appliance 102. Using processing described in more detail below, security platform 140 will determine (e.g., using malicious sample detector 170) whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. The query can be communicated to security platform by a process/connector implemented on a data plane of data appliance 102. Using processing described in more detail below, security platform 140 will determine (e.g., using a malicious file detector that may be similar to malicious sample detector 170 such as by monitoring the execution of the sample (e.g., in a sandbox) to detect/predict whether the file is a malicious file (or likely to be a malicious file) and provide a result back to data appliance 102 (e.g., "malicious file" or "benign file").

In some embodiments, when a client device (e.g., client device 104) attempts to open a file or input string that was received, such as via an attachment to an email, instant message, or otherwise exchanged via a network, or when a client device receives such a file or input string, a security process running on the client device computes a signature (e.g., according to a predefined function such as a hash function) and queries a mapping of sample signatures to indications of maliciousness (e.g., a whitelist, a blacklist, etc.) to determine whether the file was previously analyzed (e.g., previously evaluated of whether the file is malicious) and to determine whether the file is malicious. The mapping of sample signatures to indications of maliciousness may be stored in a local cache. In response to determining that the file is benign or malicious, the security process (e.g., an application running on the client device) may handle the file based on an enforcement of an applicable security policy. In response to determining that the file has not been previously analyzed, the client device may provide the file to a security entity (e.g., data appliance 102) or security platform 140. The client device may be configured to not execute the file until the security process, security entity, or security platform has analyzed the file (e.g., monitored the execution of the file in a sandbox if the file is not already on a whitelist or blacklist).

In some embodiments, when a security entity (e.g., a firewall, etc.) receives a file via network traffic communicated across a network, the security entity computes a signature (e.g., according to a predefined function such as a hash function) and queries a mapping of sample signatures to indications of maliciousness (e.g., a whitelist, a blacklist, etc.) to determine whether the file was previously analyzed (e.g., previously evaluated of whether the file is malicious) and to determine whether the file is malicious. The mapping of sample signatures to indications of maliciousness may be stored in a local cache. In response to determining that the file is benign or malicious, the security entity (e.g., an application running on the client device) may handle the file based on an enforcement of an applicable security policy (e.g., quarantine or delete the file if the file is deemed malicious, handle as normal traffic if the file is deemed benign, etc.). In response to determining that the file has not been previously analyzed, the security entity may provide the file to a cloud security service, such as security platform 140.

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh318y35.legitimatesite.com, xxx888222000444.otherlegitimatesite.com), such DNS patterns are highly unlikely to be misclassified as malicious tunneling. The following are example characteristics that can be extracted as features (e.g., into a feature vector) for a given group of domains (i.e., sharing a root domain).

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and data appliance 102 may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2:
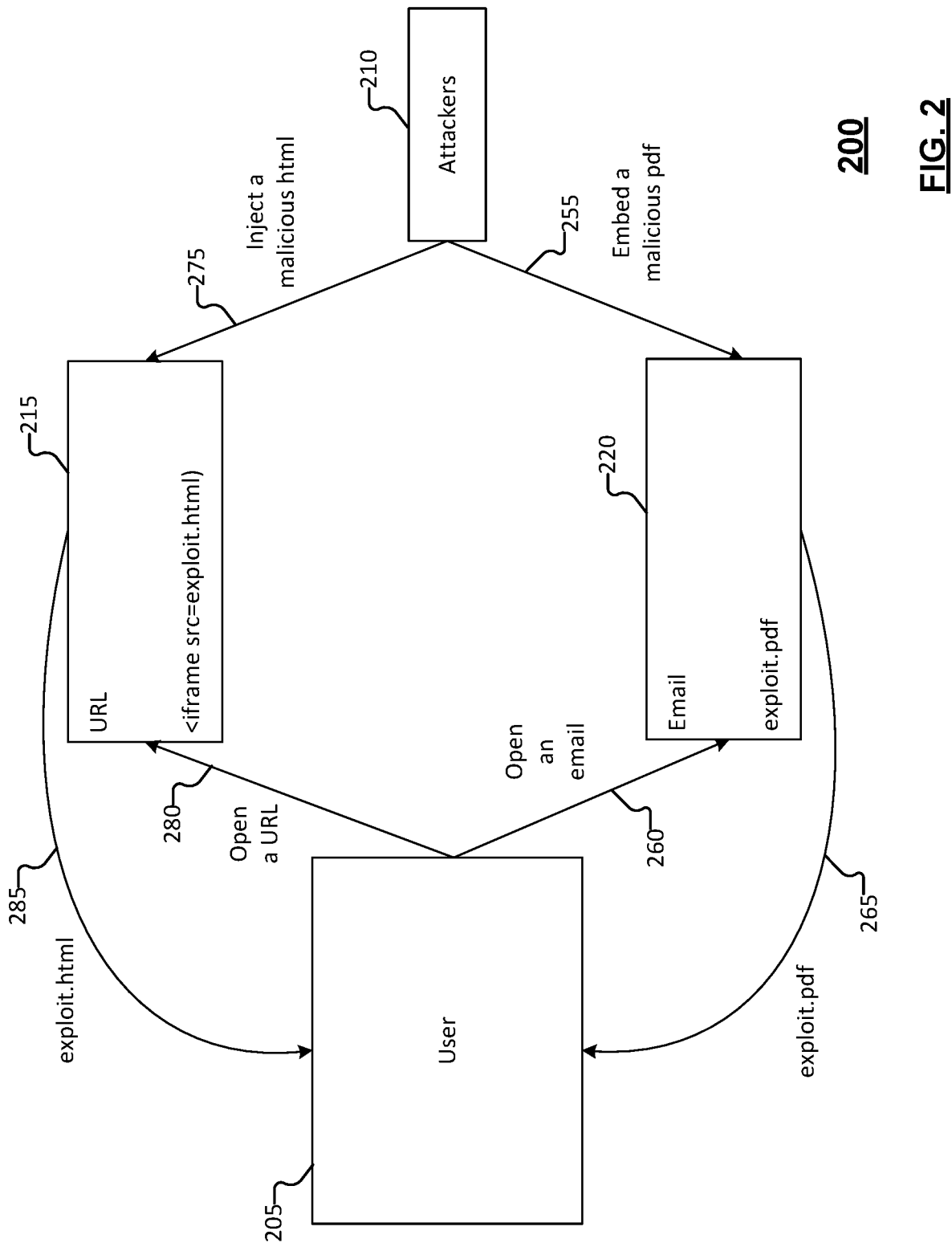
FIG. 2 is a diagram of a process by which a client system is exploited.

FIG. 2 is a diagram of a process by which a client system is exploited. In the example shown, user 205 (e.g., a client device being used by user 205) communicates with other endpoints or servers over one or more networks. For example, user 205 uses the application to open URLs or files, such as html, .doc, .pdf, etc. Attackers 210 generate files that exploit vulnerabilities in systems, such as the client device used by user 205. For example, attackers 210 generate exploits (e.g., ROP exploits) that avoid detection via static analysis techniques and certain dynamic analysis techniques.

At 255, attackers 210 generate a malicious pdf, such as by embedding an exploit within the pdf. The malicious pdf may be communicated across a network and to user 205 via an email 220, such as an attachment to an email. User 205 communicates with the network (e.g., with an email service) to obtain email 220. For example, at 260, user 205 opens email 220. In response to email 220 being opened, the application, such as Adobe Reader, which is used by user 205 to open the malicious pdf may be exploited by the embedded pdf exploit and the arbitrary code is executed on the system or device of user 205. For example, at 265, the malicious pdf is communicated to user 205, which may execute the malicious pdf.

At 275, attackers 210 generate a malicious HTML, such as by injecting a malicious HTML exploit into a legitimate web page belonging to a URL. The malicious HTML exploit may be communicated across a network and to user 205 via accessing URL 215. User 205 communicates with the network to obtain URL 215. For example, at 280, user 205 opens URL 215. In response to URL 215 being opened, the application, such as a web browser, which is used by user 205 to open URL 215 may be exploited by the injected HTML exploit and the arbitrary code is executed on the system or device of user 205. For example, at 285, the malicious html is communicated to user 205, which may execute the malicious html (e.g., in connection with rendering the page for URL 215 by the browser).

Figure 3:
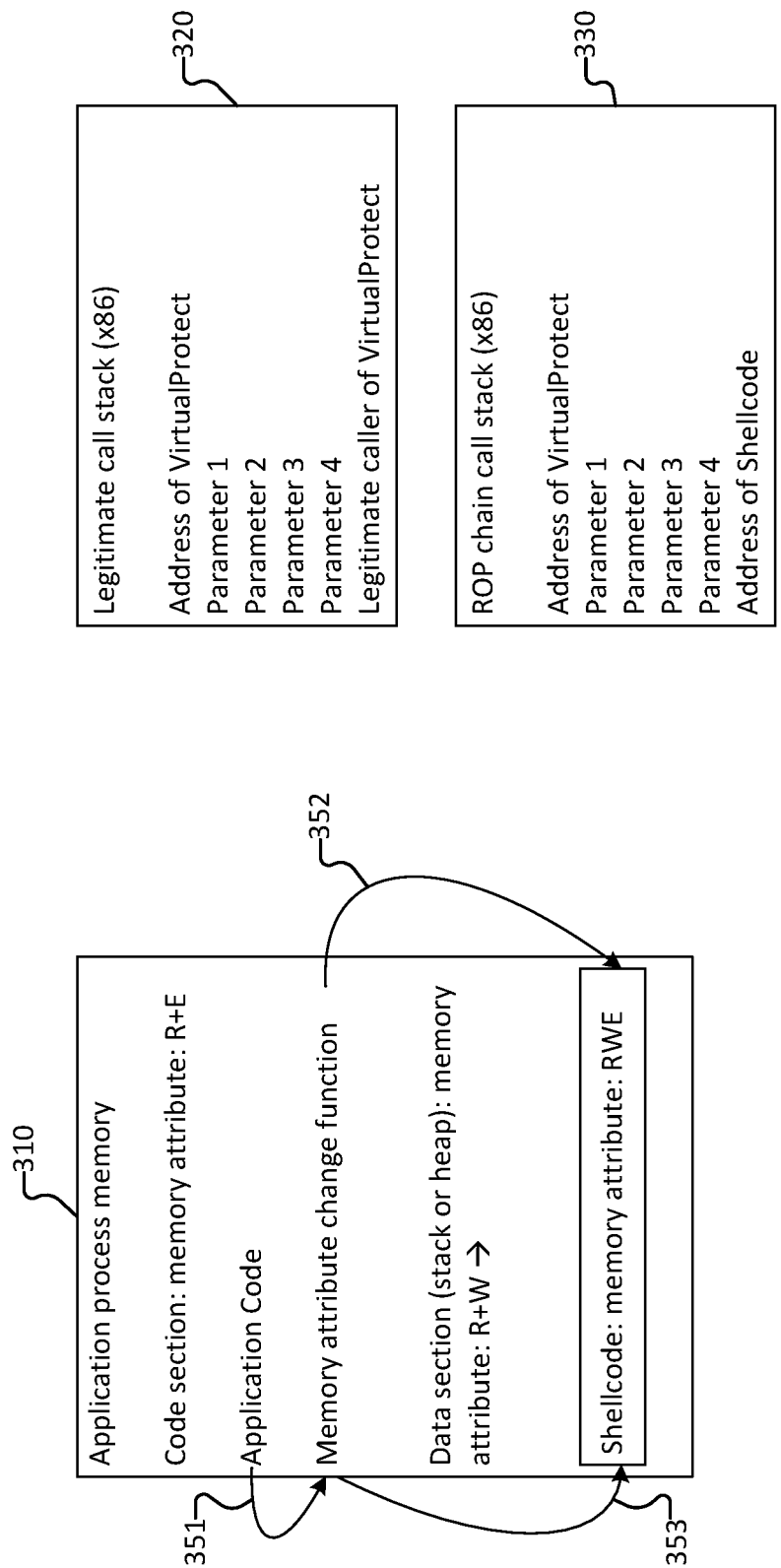
FIG. 3 is a diagram of a process by which a client system is exploited.

FIG. 3 is a diagram of a process by which a client system is exploited. The example shown illustrates a process by which an ROP exploit is executed a client system. The example described herein is in relation to an Intel x86 environment, however, similar mechanisms may be implemented in other environments. In connection with executing a file, the environment is configured to include application process memory 310. Application process memory includes a code section and data section (e.g., the stack and heap). The code section includes the application code and various functions that may be invoked. The memory attribute for the code section is read and execute (R+E). The memory attribute for the data section is read and write.

An ROP exploit includes a malicious ROP chain call stack 330. For example, the ROP exploit replaces call stack 320 with the malicious chain call stack 330. For call stack 320 which refers to a legitimate call to a memory attribute change function (e.g., VirtualProtect( ), the return address is legitimate the caller of the function. However, in an ROP exploit scenario, an ROP chain will insert the address of the shellcode stored in the data section of the application process memory 310 at the memory location of the return address of the memory attribute change function, which leads to call stack 330.

At 351, a vulnerability in the system (e.g., the application) is exploited and the execution flow is hijacked and configured to correspond to the ROP chain (e.g., the malicious call stack 330). At 352, the ROP chain invokes the memory attribute change function to configure the data section (e.g., at least a part of data section, such as the section storing the shellcode) to be executable. For example, the memory attribute change function changes the memory attribute of the data section to be read, write, and executable (RWE). The return address for the memory attribute change function in the malicious ROP chain call stack 330 is the address of the shellcode within the data section of application process memory 310. Accordingly, at 353, the shellcode at the shellcode address corresponding to the return address of the memory attribute change function is called, thereby causing the malicious shellcode to be executed and the system to become infected.

Figure 4:
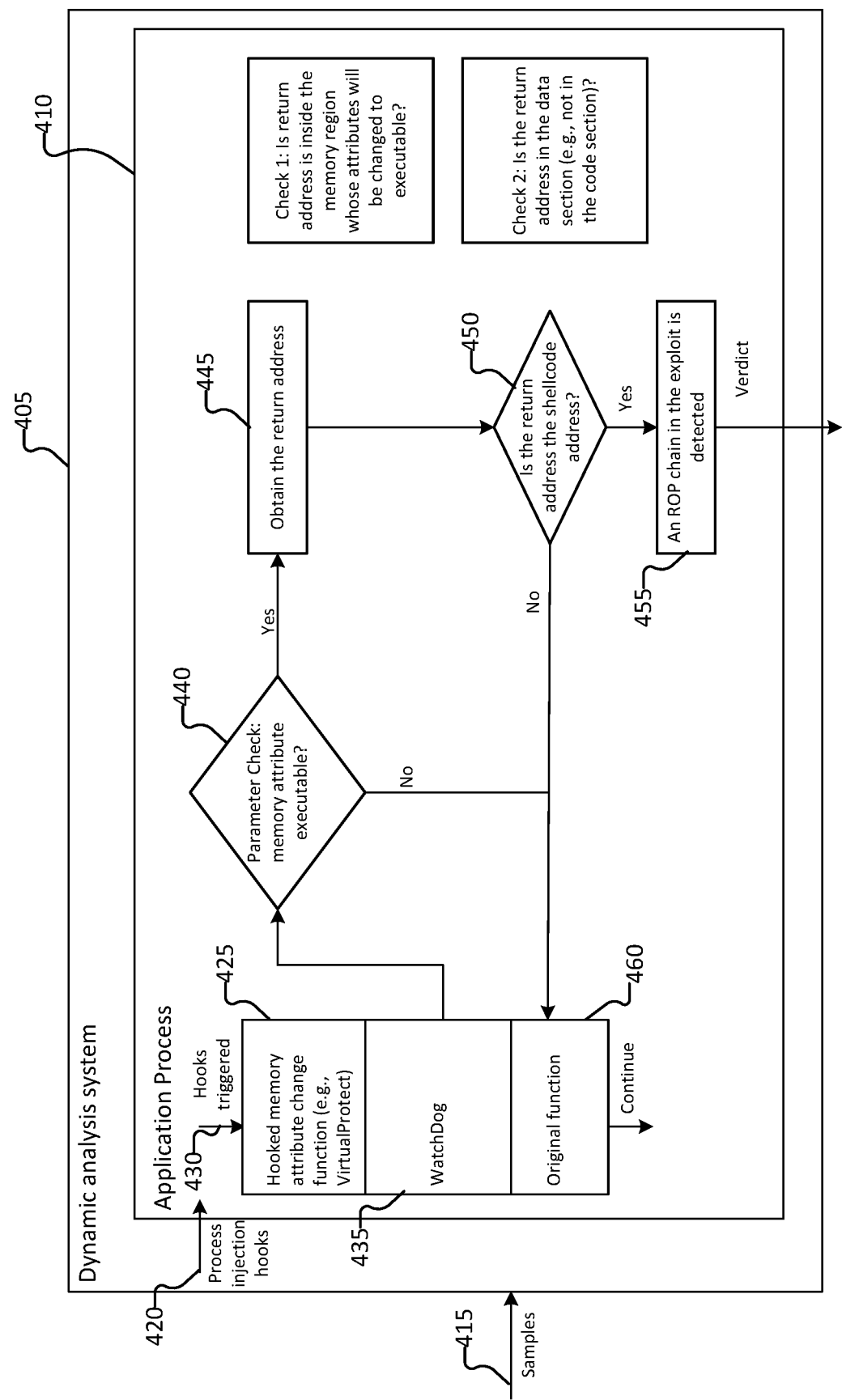
FIG. 4 is a block diagram of an environment in which maliciousness of traffic is evaluated according to various embodiments.

FIG. 4 is a block diagram of an environment in which maliciousness of traffic is evaluated according to various embodiments. Various embodiments implement a dynamic analysis system in connection with detecting ROP exploits. The dynamic analysis system may be implemented at a security entity (e.g., for inline evaluation), a cloud security service (e.g., a security platform), or on a client device.

In the example shown, system 400 comprises dynamic analysis system 405. System 400 may configure dynamic analysis system 405 to be an isolated environment (e.g., a sandbox) in which applications may be executed and parts of the system outside the sandbox are not affected by execution within the isolated environment. At 415, system 400 receives samples to be evaluated. For example, system 400 receives the samples from a security entity that processes network traffic. In response to receiving the samples, system 400 determines to evaluate the samples within dynamic analysis system 405. Accordingly, dynamic analysis system 405 configures application process 410 for evaluating the sample.

In some embodiments, in connection with evaluating the sample to determine whether the sample is an ROP exploit, system 400 (e.g., dynamic analysis system 405) configures application process 410 to comprise hooks that are triggered upon certain events during runtime. For example, at 420, dynamic analysis system 405 injects one or more hooks into application process 410. In some embodiments, the one or more hooks are triggered in response to a memory attribute change function being called.

In some embodiments, injecting the one or more hooks into application process 410 includes injecting a predefined detection library into the process running the vulnerable application (or the sample being evaluated). In order to execute the detection logic, the detection library is to be loaded in the process running the application that will be potentially exploited using an ROP chain. Multiple process injection techniques exist on various operating systems, such as Windows, Linux and MacOs.

Various embodiments implement the DLL injection technique on Windows to inject the predefined detection library. When the detection library is loaded, hooks on the memory attributes change functions (e.g., all memory attribute change functions) are created and enabled. When a hook is triggered, the system checks the memory attribute parameter of the memory attribute change function to see if the memory attribute of the memory region is changed from non-executable to executable, such as setting the third parameter flNewProtect of VirtualProtect function to PAGE_EXECUTE_READWRITE (RWE). Various embodiments check to determine whether the memory attribute parameter of is changed to be executable because an exploit has to bypass data execution prevention (DEP) by calling the memory attribute change function to set the memory region including the shellcode (e.g., usually the heap or stack) as executable. The system may disregard the setting the memory attribute to non-executable. If the memory attribute of the memory region is changed from non-executable to executable, the return address of the memory attribute change function is obtained and the detection logic is performed with respect to the return address. In some embodiments, the return address in the context of the hooked memory attribute change function is obtained by obtaining the call stack of the current thread and then walking through the call stack to retrieve the caller of the hooked memory attribute change function.

At 425, the hooked memory attribute change function is invoked during execution of the sample. As an example, the hooked memory attribute change function corresponds to VirtualProtect( ) which is a function in the Windows-based operating system that can be used to change the permissions on a page in memory. Various other memory attribute change functions may be hooked. For example, various other operating systems may have similar memory attribute change functions.

In response to the hooked memory attribute change function being invoked, at 430, the one or more hooks are triggered. The one or more hooks are thus used to detect when a memory attribute change function is called during execution of the sample. In response to the one or more hooks being triggered at 430, dynamic analysis system 405 (e.g., application process 410) causes a security protocol 435 to be executed (e.g., a watchdog that is configured to perform one or more checks to determine whether the sample is an ROP exploit). In response to security protocol 435 being invoked, security protocol 435 causes system 400 (e.g., dynamic analysis system 405) to determine whether at least part of the data section of the application process memory is configured to be executable. For example, system 400 determines whether the invocation of the memory attribute change function corresponds to a configuration of the data section of the application process memory to be executable (e.g., read, write, and executable). In response to determining that at least part of the data section of the application process memory is configured to be executable, 445 is performed. Otherwise, in response to determining that the data section of the application process memory is not executable, at 460 the original function is performed and the execution of the sample continues.

At 445, a return address is obtained. In some embodiments, dynamic analysis system 405 (e.g., security protocol 435) determines a return address for the memory attribute change function. There are several ways to retrieve the function return address in the context of the hooked memory attribute change function on x86 and x64 Windows platforms. On x64 Windows, either the _ReturnAddress intrinsic or the API StackWalk(64) may be implemented. The _ReturnAddress intrinsic is an instruction that is implemented to get return addresses for functions. The Windows API StackWalk traverses the call stack to obtain the return address. For example, the Stack Walk function is used to obtain a depth of the stack trace and to walk on the stack trace to retrieve the caller of the hooked function. On x86 Windows, the system may also implement the using the stack frame pointer (EBP) to reconstruct stack frames and walk on the stack frames in order to retrieve the return address (e.g., the call stack pointer are recursively searched for a return address for the memory attribute change function). The return address may immediately follow the call to the memory attribute change function. In some situations, multiple layer return addresses are required to be supplied to avoid possible false negatives, but the method of retrieving multiple layer return addresses is the same.

In response to obtaining the return address of the memory attribute change function at 445, dynamic analysis system 405 (e.g., security protocol 435) performs 450 at which dynamic analysis system 405 determines whether the obtained return address of the memory attribute change function corresponds to the shellcode address. For example, the system determines whether the return address corresponds to a location within the data section of the application process memory. In response to determining that the return address corresponds to the shellcode address at 450, at 455 the system determines that an ROP chain in the exploit is detected. Dynamic analysis system 405 may provide a verdict that the sample is an ROP exploit. In response to receiving the verdict, the system may handle the sample according to a predefined security policy for malicious files, or provide an indication to a security entity or other system or service that provided the sample for evaluation. In response to determining that the return address does not correspond to the shellcode address at 450, the system implements the original function at 460 and execution of the sample continues (e.g., until execution is complete or another call to the memory attribute change function is hooked).

Various embodiments implement detection logic comprising two checks for evaluating whether a sample is an ROP exploit. In some implementations, the system determines that the sample is an ROP exploit in response to determining that both checks are satisfied. In some implementations, the system determines that the sample is an ROP exploit in response to determining that at least one of the checks is satisfied.

In some embodiments, the detection logic comprises a first check. The system performs the first check to verify if the return address for the memory attribute change function is inside the memory region whose memory attributes are to be changed by the memory attribute change function. The starting address of the memory region and the size of the memory region may both be retrieved or calculated from parameters of the memory attribute change function. For example: the IpAddress and dwSize parameter of the VirtualProtect function. If the system determines that the return address for the memory attribute change function is within the memory region for which the memory attributes are changed to executable, the system deems that the execution flow will jump to the memory region that is just configured with the memory attribute to be executable. Because exploits include a return address that is the starting address of the shellcode, the return address for the memory attribute change function being within the memory region for which the memory attribute is being modified is indicative of the sample being an ROP exploit. For example, the shellcode is located inside a memory region that is just configured by the memory attribute change function to have the memory attribute to be executable. As an example, the detection logic may determine that a sample is an exploit in response to determining that a heap whose memory attribute is changed from PAGE_READWRITE(RW) to PAGE_EXECUTE_READWRITE(RWE).

In some embodiments, the detection logic comprises a second check. The system performs the second check to determine (e.g., verify) whether the return address for the memory attribute change function is not in the code section (e.g., usually .text section) of a loaded module in the vulnerable application. For example, the detection logic enumerates all loaded modules to check if the return address belongs to any of the loaded modules. For example, either using the API EnumerateLoadedModulesEx or traversing PEB LDR_DATA_TABLE_ENTRY structure works in Windows. In system comprising certain operating systems (e.g., Windows): the detection logic may call the API VirtualQuery and check the type of the returned MEMORY_BASIC_INFORMATION structure to determine whether it is an image type. If the return address for the memory attribute change function is not in the code section, the execution flow will jump to an address which does not belong to any loaded module but other memory regions such as heap, stack, etc. Such a process flow is behavior used by exploits because usually the return address is the starting address of the shellcode, which is located inside a memory region (usually a heap or stack) and does not belong to the code section of any loaded module.

FIG. 5 is a diagram of an example of an ROP exploit and detection of the ROP exploit during runtime. As illustrated in FIG. 5, exploit 510 is an example of an ROP exploit. In the code snippet, the memory attribute change function is called to configure a memory location to be executable (e.g., read, write, and executable). Further, the return address for the memory attribute change function corresponds to the shellcode address.

According to various embodiments, the system implements detection logic that is called/invoked in response to the triggering of a hook injected into the application process. In the example shown, watchdog 520 (e.g., detection logic) is invoked upon triggering of the hook for the memory attribute change function (e.g., VirtualProtect( )). In response to detection that the memory attribute change function is called, watchdog 520 determines whether the memory attribute for a location in the data section is configured to be executable (e.g., RWE). Watchdog 520 further obtains the return address for the memory attribute change function, and determines whether the return address corresponds to the shellcode address. In the example shown, watchdog 520 determines that the return address corresponds to a memory page type that is not a mem_image, and that the return address does not belong to any loaded module. Accordingly, watchdog 520 determines the sample to be an ROP exploit.

Figure 6:
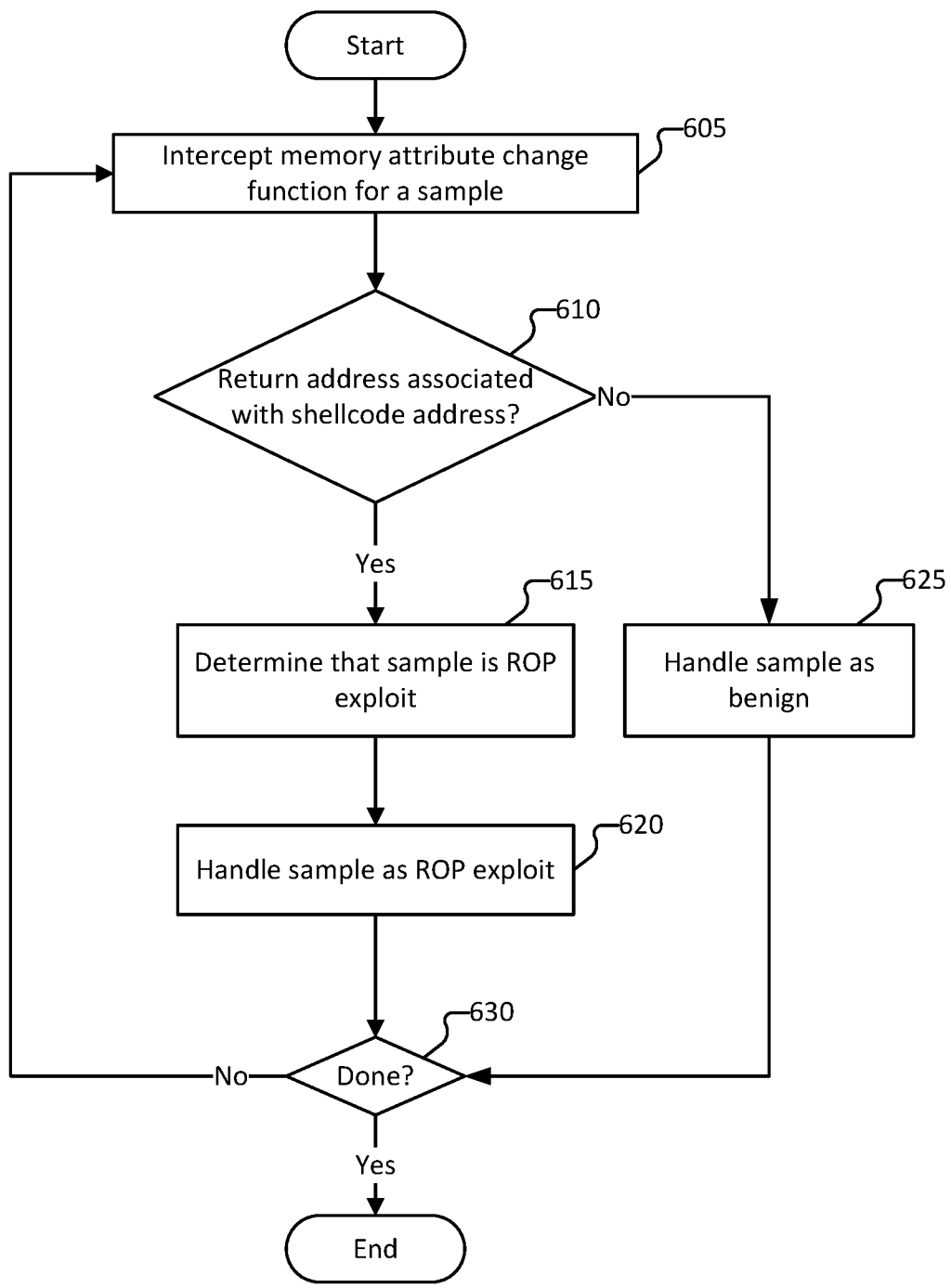
FIG. 6 is a flow diagram of a method for evaluating whether a sample is an ROP exploit according to various embodiments.

FIG. 6 is a flow diagram of a method for evaluating whether a sample is an ROP exploit according to various embodiments. In some embodiments, process 600 is implemented at least in part by system 100 of FIG. 1 and/or system 200 of FIG. 2.

At 605, a memory attribute change function is intercepted for a sample. In some embodiments, the memory attribute change function is intercepted by one or more hooks that are injected into the application process for the sample. For example, the system starts in a dynamic analysis environment (e.g., a sandbox) an application process for the sample. In connection with configuring the application process, the system injects hooks to the application process. The hooks are configured to be triggered in response to a memory attribute change function being called. In response to a memory attribute change function being called, the system generates an intercept and the system monitoring execution of the sample obtains the memory attribute change function intercept.

In some embodiments, in response to the hook for the memory attribute change function being triggered, the system may invoke a security protocol according to which the system determines whether the sample is malicious. For example, the system evaluates whether the sample is an ROP exploit based on a set of one or more checks. The set of one or more checks may include: (i) a determination of whether the memory attribute change function is being called to configure a part of the data section of the application process memory to be executable, (ii) a determination of whether the return address for the memory attribute change function corresponds to the shellcode address (e.g., is within the data section of the application process memory, is not part of a loaded module, etc.).

At 610, the system determines whether the return address is associated with a shellcode address. In response to determining that the return address is associated with the shellcode address at 610, process 600 proceeds to 615. Conversely, in response to determining that the return address is not associated with the shellcode address at 610, process 600 proceeds to 625.

At 615, the sample is determined to be an ROP exploit. In some embodiments, the system determines that the sample is an ROP exploit in response to determining that the return address is associated with the shellcode address.

At 620, the sample is handled as an ROP exploit. In response to determining that the sample is an ROP exploit, the system determines to handle the sample as an ROP exploit. For example, the system handles the sample as malicious traffic.

In some embodiments, handling the sample as an ROP exploit or malicious traffic includes applying (e.g., enforcing) one or more security policies with respect to the sample.

According to various embodiments, the handling of the file malicious traffic/information (e.g., the sample deemed an ROP exploit) may include performing an active measure. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the file to an indication that the file is malicious, etc.

At 625, the sample is handled as benign. In response to determining that the sample is not an ROP exploit, the system handles the sample according to normal traffic.

At 630, a determination is made as to whether process 600 is complete. In some embodiments, process 600 is determined to be complete in response to a determination that no further samples are to be processed (e.g., no traffic data is to be assessed with respect to a security analysis), a determination that the execution of the sample is complete, a determination that evaluation of the sample is complete, an administrator indicates that process 600 is to be paused or stopped, etc. In response to a determination that process 600 is complete, process 600 ends. In response to a determination that process 600 is not complete, process 600 returns to 605.

Figure 7:
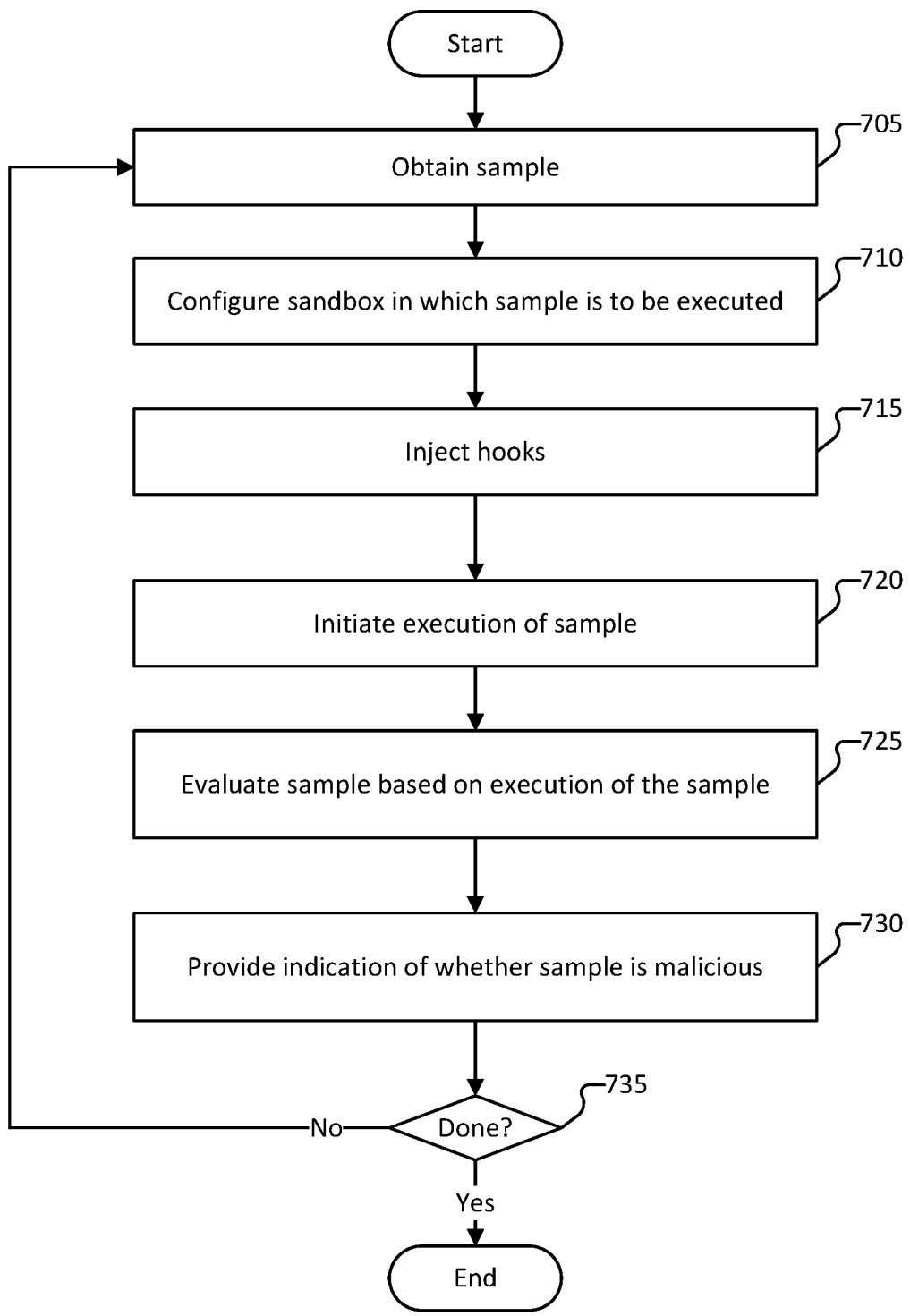
FIG. 7 is a flow diagram of a method for evaluating whether a sample is an ROP exploit according to various embodiments.

FIG. 7 is a flow diagram of a method for evaluating whether a sample is an ROP exploit according to various embodiments. In some embodiments, process 700 is implemented at least in part by system 100 of FIG. 1 and/or system 200 of FIG. 2. In some embodiments, process 700 is invoked by 610 of process 600 of FIG. 6.

At 705, a sample is obtained. In some embodiments, the sample is obtained from network traffic. For example, a security entity (e.g., a firewall) may extract the sample from network traffic being communicated across the network. As another example, a client device may obtain the sample from an email (e.g., an email attachment), an html file, or the like. As another example, a cloud security service (e.g., a security platform) receives the sample from a security entity or client device in connection with a request to perform a remote evaluation.

At 710, a sandbox in which the sample is to be executed is configured. In response to obtaining the sample, the system determines to evaluate the sample for an indication that the sample is an ROP exploit. In connection with evaluating the sample, the system configures an isolated environment in which the sample may be executed without the potential of infecting the remainder of the system. The system may then instantiate an application process for the sample within the sandbox.

At 715, a hook(s) are injected. The system injects one or more hooks into the application process for execution of the sample. The hook(s) may be configured to be triggered in response to a memory attribute change function being invoked. For example, a set of hooks may be injected with respect to all memory attribute change functions that may be called to configure the memory attribute(s) of a memory.

At 720, an execution of the sample is initiated. In response to configuring the isolated environment and injecting the one or more hooks, the system executes the sample for monitoring of the sample during runtime.

At 725, the sample is evaluated based on the execution of the sample. The system monitors the execution of the sample and evaluates whether the sample is malicious (e.g., is an ROP exploit) based at least in part on monitoring whether one of the sets of hooks are triggered during execution.

In some embodiments, in response to a memory attribute change function being invoked, at least one of the set of hooks is triggered. In response to determining that a hook is triggered, the system may invoke a security protocol. For example, the system may launch a process to perform a set of checks in connection with evaluating whether the sample is an ROP exploit.

In some embodiments, the system determines whether the invocation of the memory attribute change function corresponds to a configuration of the data section of the application process memory to be executable. For example, the security protocol includes determining whether the memory attribute change function is called in connection with configuring a part of the data section (e.g., a shellcode address) to be executable.

In some embodiments, the system obtains the return address for the memory attribute change function and determines whether the return address corresponds to the shellcode address. For example, the security protocol includes obtaining the return address, for the memory attribute change function and determining whether the return address corresponds to a location within the data section (e.g., a location of the data section that has a memory attribute set to be executable, etc.).

At 730, an indication of whether the sample is malicious. In response to evaluating the sample, the system provides an indication of whether the sample is malicious. The indication of whether the sample is malicious may be provided by another system, service, or process that invoked process 700. In some embodiments, in response to determining that (i) the memory attribute change function is used to configure a part of the data section the application process memory to be executable, and/or (ii) the return address for the memory attribute change function corresponds to the shellcode address (e.g., the return address corresponds to a location within the data section that is executable), the system determines that the sample is an ROP exploit and the system provides an indication that the sample is an ROP exploit. Otherwise, the system may provide an indication that the sample is benign (or not deemed an ROP exploit).

At 735, a determination is made as to whether process 700 is complete. In some embodiments, process 700 is determined to be complete in response to a determination that no further samples are to be processed (e.g., no traffic data is to be assessed with respect to a security analysis), a determination that the execution of the sample is complete, a determination that evaluation of the sample is complete, an administrator indicates that process 700 is to be paused or stopped, etc. In response to a determination that process 700 is complete, process 700 ends. In response to a determination that process 700 is not complete, process 700 returns to 705.

Figure 8:
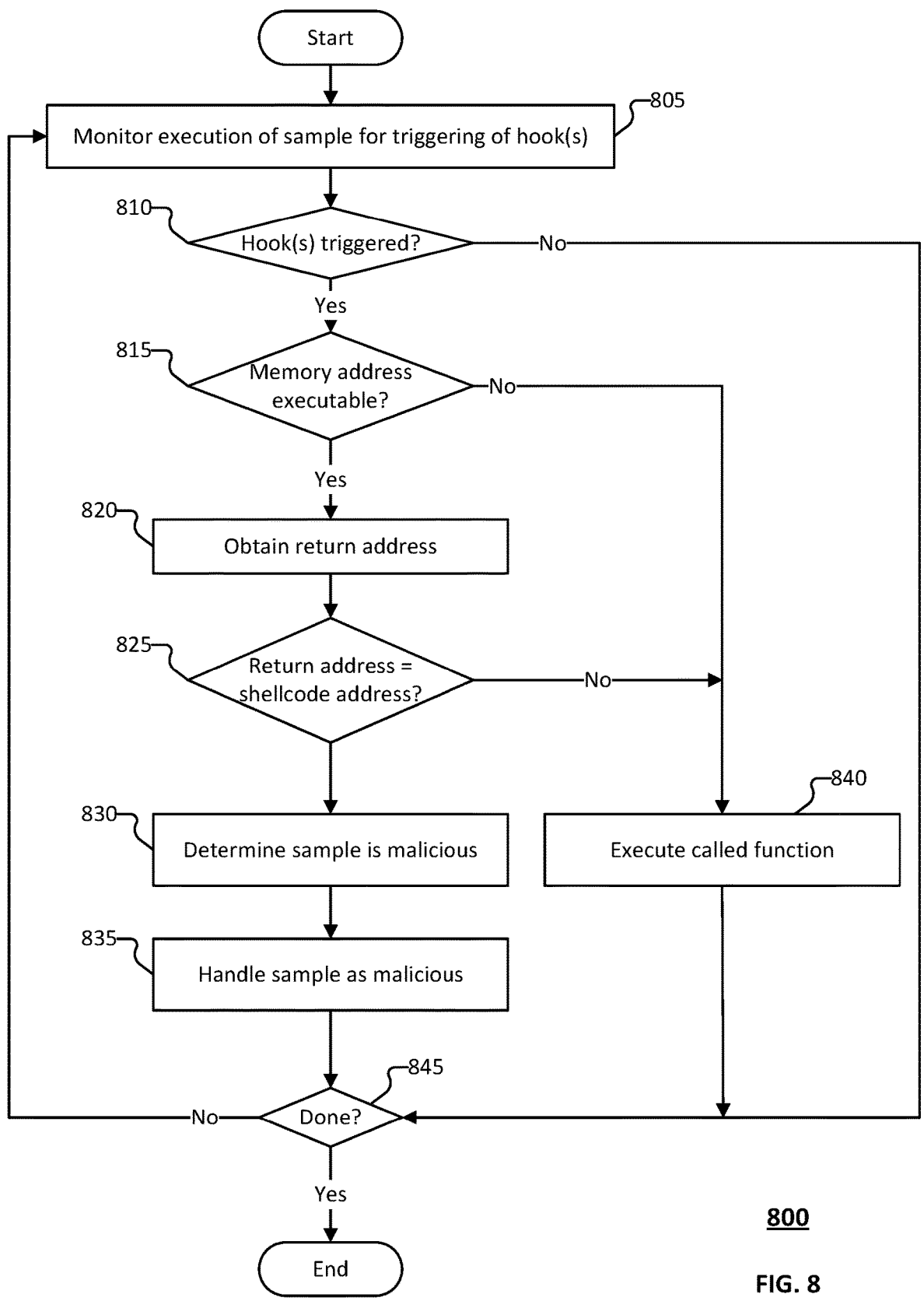
FIG. 8 is a flow diagram of a method for evaluating whether a sample is an ROP exploit according to various embodiments.

FIG. 8 is a flow diagram of a method for evaluating whether a sample is an ROP exploit according to various embodiments. In some embodiments, process 800 is implemented at least in part by system 100 of FIG. 1 and/or system 200 of FIG. 2.

At 805, execution of a sample is monitored for a triggering of a hook(s). In some embodiments, the system injects a set of hooks to an application process for monitoring the invocation of a memory attribute change function. Upon a memory attribute change function being called, at least one of the set of hooks is triggered. The system may receive an intercept in response to a hook being triggered.

At 810, the system determines whether a hook(s) is triggered. In response to determining that a hook(s) is triggered, process 800 proceeds to 815. Conversely, in response to determining that a hook is not triggered, process 800 proceeds to 845 and process iterates over 805-810 until the system detects that a hook is triggered or the process is otherwise terminated.

At 815, the system determines whether the attribute of a memory address is set to be executable. In some embodiments, in response to determining that a hook is triggered (e.g., because the memory attribute change function is called), the system determines whether a data section (or part thereof) of the application process memory is configured (e.g., being configured as a result of the call to the memory attribute change function) to be executable.

In response to determining that the memory address is configured as executable at 815, process 800 proceeds to 820. Conversely, in response to determining that the memory address is not configured as executable at 815, process 800 proceeds to 840.

At 820, a return address is obtained. In some embodiments, the system obtains the return address for the memory attribute change function. For example, the system determines what is to be called/executed after the memory attribute is configured.

At 825, the system determines whether the return address is in the same memory region as the shellcode address. In response to determining that the return address is in the same memory region as the shellcode address, process 800 proceeds to 830. In response to determining that the return address is not the same as the shellcode address, process 800 proceeds to 840.

At 830, the sample is determined to be malicious.

At 835, the sample is handled as malicious. In some embodiments, the system enforces one or more security policies with respect to handling samples deemed to be malicious.

At 840, the called function is executed. In response to determining that the sample is not deemed to be malicious (e.g., is not characterized based on the security protocol to be malicious), the system may permit the sample to continue to execute normally until the execution is complete or another hook is triggered.

At 845, a determination is made as to whether process 800 is complete. In some embodiments, process 800 is determined to be complete in response to a determination that no further samples are to be processed (e.g., no traffic data is to be assessed with respect to a security analysis), an administrator indicates that process 800 is to be paused or stopped, etc. In response to a determination that process 800 is complete, process 800 ends. In response to a determination that process 800 is not complete, process 800 returns to 805.

Figure 9:
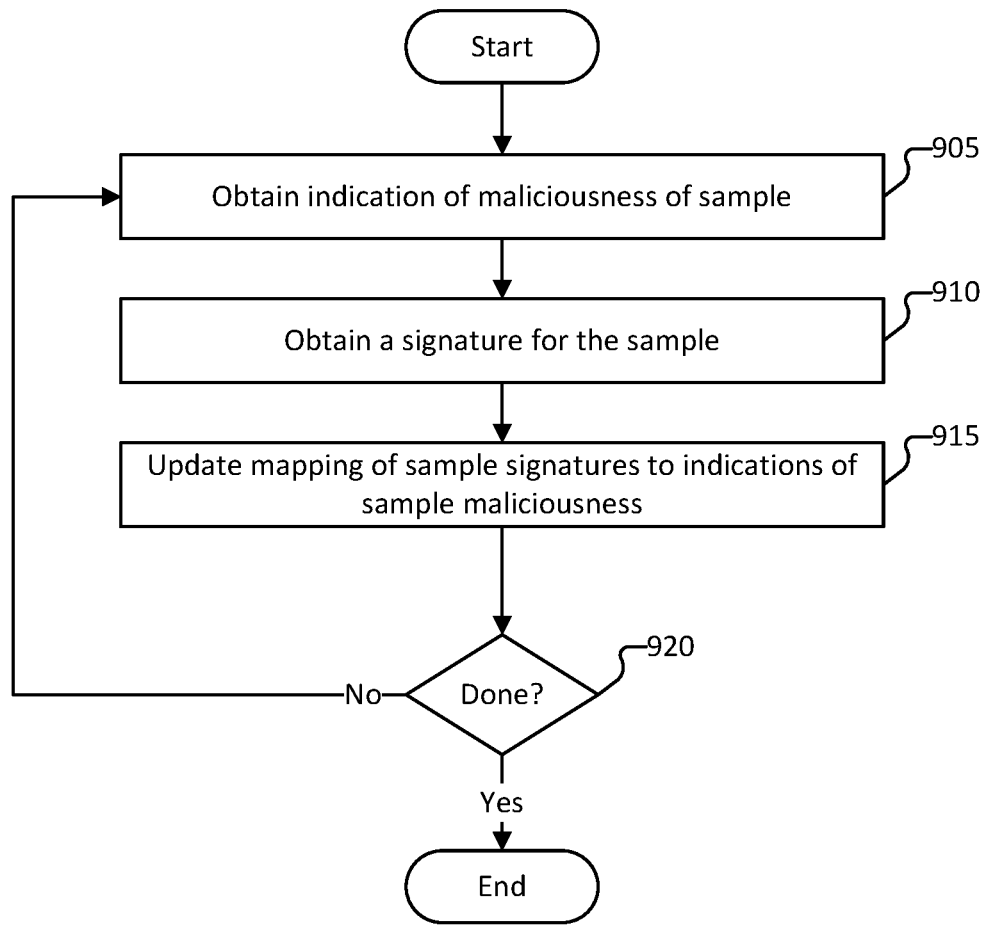
FIG. 9 is a flow diagram of a method for handling a sample based on a maliciousness determination according to various embodiments.

FIG. 9 is a flow diagram of a method for handling a sample based on a maliciousness determination according to various embodiments. In some embodiments, process 900 is implemented at least in part by system 100 of FIG. 1 and/or system 200 of FIG. 2.

At 905, an indication of the maliciousness of a sample is obtained.

At 910, a signature for the sample is obtained. In response to the system determining whether the sample is malicious, the system may compute a signature based on a predefined function (e.g., a hashing function). The system may add the signature to historical information of files that have been analyzed to enable the system (or other systems such as a security entity or client device) to quickly check whether a received sample has been previously analyzed and is malicious or benign.

At 915, a mapping of sample signatures to indications of sample maliciousness. The system stores in the mapping a record of the signature in association with an indication of whether the sample is malicious. As an example, the mapping may be a whitelist of previously analyzed samples deemed to be benign. As another example, the mapping may be a blacklist of previously analyzed samples deemed to be malicious (e.g., deemed to be ROP exploits).

At 920, a determination is made as to whether process 900 is complete. In some embodiments, process 900 is determined to be complete in response to a determination that no further samples are to be processed (e.g., no traffic data is to be assessed with respect to a security analysis), an administrator indicates that process 900 is to be paused or stopped, etc. In response to a determination that process 900 is complete, process 900 ends. In response to a determination that process 900 is not complete, process 900 returns to 905.

Although examples provided herein are described in the context of Windows operating systems, various embodiments may implement similar techniques for detecting malicious samples (e.g., ROP exploits) in other operating system environments, such as Android, iOS, MacOS, Linux, etc. Various other operating systems may be implemented.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting Return Oriented Programming (ROP) exploits, comprising:
   one or more processors configured to:
      intercept a memory attribute change function for a sample;
      determine whether a memory attribute is changed to be executable;
      in response to determining that the memory attribute is changed to be executable, determine if a return address is associated with a shellcode address; and
      in response to determining that the return address is associated with the shellcode address, determine that the sample is an ROP exploit; and
   a memory coupled to the one or more processors and configured to provide the one or more processors with instructions.

2. The system of claim 1, wherein detection of whether the sample is an ROP exploit is performed during runtime of the sample.

3. The system of claim 1, wherein in response to determining that the sample is the ROP exploit, a signature for the sample is determined, and a list of malicious samples is updated to include the signature for the sample.

4. The system of claim 3, wherein the signature for the sample is communicated to one or more security entities.

5. The system of claim 1, wherein the ROP exploit is detected at an endpoint.

6. The system of claim 1, wherein the ROP exploit is detected at an inline security entity.

7. The system of claim 1, wherein the ROP exploit is detected at a cloud service.

8. The system of claim 7, wherein detection of the ROP exploit includes executing the sample within a sandbox and performing dynamic analysis during execution.

9. The system of claim 1, wherein:
   the one or more processors are further configured to:
      determine, during execution of the sample, whether a memory attribute is changed to be executable.

10. The system of claim 1, wherein the one or more processors are further configured to:
    obtain the return address of the memory attribute change function.

11. The system of claim 10, wherein the return address is obtained based at least in part on one or more of: (i) using a _ReturnAddress intrinsic; (ii) analyzing a call stack based on a stack pointer, and (iii) walking the call stack using a stack walk API.

12. The system of claim 1, wherein in response to determining that the sample is the ROP exploit, the process executing the sample is killed.

13. The system of claim 1, wherein the one or more processors are further configured to detect shellcode executing in a data section of memory.

14. The system of claim 1, wherein the one or more processors are further configured to perform an active measure in response to determining that the sample is the ROP exploit.

15. The system of claim 14, wherein the active measure includes communicating an alert to a user.

16. The system of claim 1, wherein the one or more processors are further configured to:
    inject one or more hooks with respect to a memory attribute change function, wherein the one or more hooks are used to intercept the memory attribute change function upon the memory attribute change function being called during execution of the sample.

17. The system of claim 1, wherein the one or more processors are further configured to:
    in response to determining that the return address is not associated with the shellcode address, execute an original function called during execution of the sample.

18. The system of claim 1, wherein the memory attribute change function comprises a VirtualProtect function in a Windows operating system.

19. A method for detecting Return Oriented Programming (ROP) exploits, comprising:
    intercepting, by one or more processors, a memory attribute change function for a sample;
    determining whether a memory attribute is changed to be executable;
    in response to determining that the memory attribute is changed to be executable, determining if a return address is associated with a shellcode address; and
    in response to determining that the return address is associated with the shellcode address, determining that the sample is an ROP exploit.

20. A computer program product embodied in a non-transitory computer readable medium for detecting Return Oriented Programming (ROP) exploits, and the computer program product comprising computer instructions for:
    intercepting, by one or more processors, a memory attribute change function for a sample;
    determining whether a memory attribute is changed to be executable;
    in response to determining that the memory attribute is changed to be executable, determining if a return address is associated with a shellcode address; and
    in response to determining that the return address is associated with the shellcode address, determining that the sample is an ROP exploit.

21. The system of claim 1, wherein the memory attribute is determined to be changed to be executable based at least in part on the intercepted memory attribute change function.

22. The system of claim 1, wherein the memory attribute is determined to be changed to be executable based at least in part on a determination that a data section for an application process of the sample is set to read, write, or executable.

23. The system of claim 1, wherein determining that the return address is associated with the shellcode address comprises determining that a return address of the memory change function corresponds to a location in memory that is outside a code section of the sample.

* * * * *